(12) United States Patent
Hamilton, II et al.

(10) Patent No.: US 9,166,944 B2
(45) Date of Patent: *Oct. 20, 2015

(54) SYSTEMS AND METHODS FOR USING SOCIAL NETWORK ANALYSIS TO SCHEDULE COMMUNICATIONS

(71) Applicant: International Business Machines Corporation, Armonk, NY (US)

(72) Inventors: Rick A. Hamilton, II, Charlottesville, VA (US); James R. Kozloski, New Fairfield, CT (US); Brian M. O'Connell, Cary, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/017,544

(22) Filed: Sep. 4, 2013

(65) Prior Publication Data

US 2014/0280637 A1 Sep. 18, 2014

Related U.S. Application Data

(63) Continuation of application No. 13/796,152, filed on Mar. 12, 2013.

(51) Int. Cl.
*H04L 12/58* (2006.01)
(52) U.S. Cl.
CPC ..................................... *H04L 51/32* (2013.01)

(58) Field of Classification Search
CPC ....... H04L 51/32; H04L 51/10; H04L 67/306; H04L 12/5855; H04L 12/589; H04L 51/14
USPC .................................................. 709/206, 207
See application file for complete search history.

(56) References Cited

U.S. PATENT DOCUMENTS

| 7,783,710 | B2 | 8/2010 | Ramaswamy |
| 7,870,883 | B2 | 1/2011 | Munroe et al. |
| 8,355,955 | B1 * | 1/2013 | Mirchandani et al. ....... 705/26.1 |
| 8,924,326 | B2 * | 12/2014 | Arquette et al. ................ 706/45 |
| 2010/0064006 | A1 | 3/2010 | Chaintreau et al. |
| 2010/0280908 | A1 | 11/2010 | Benz et al. |
| 2012/0057456 | A1 * | 3/2012 | Bogatin et al. ............. 370/230.1 |
| 2013/0091223 | A1 * | 4/2013 | DeLuca et al. ................ 709/206 |

OTHER PUBLICATIONS

P. Hui et al., "BUBBLE Rap: Social-Based Forwarding in Delay Tolerant Networks," 9th ACM International Symposium on Mobile Ad Hoc Networking and Computing (MobiHoc), May 2008, pp. 241-250, Hong Kong, China.

(Continued)

*Primary Examiner* — Ruolei Zong
(74) *Attorney, Agent, or Firm* — Vazken Alexanian; Ryan, Mason & Lewis, LLP

(57) ABSTRACT

Systems and methods for improving the effectiveness of communications over a social network. A method for controlling network communication, comprises analyzing a social network in response to a request made by a user to send a message to a node in the social network, delaying for a period of time sending of the message based on a result of the analyzing, and sending the message to the node in the social network after the period of time has elapsed.

14 Claims, 5 Drawing Sheets

(56) References Cited

OTHER PUBLICATIONS

E.M. Daly et al., "Social Network Analysis for Routing in Disconnected Delay-Tolerant MANETs," 8th ACM International Symposium on Mobile Ad Hoc Networking and Computing (MobiHoc), Sep. 2007, pp. 32-40, Montreal, Quebec, Canada.

F. Malandrino et al., "Proactive Seeding for Information Cascades in Cellular Networks," IEEE INFOCOM, Mar. 2012, pp. 1719-1727.

H. Sharara et al., "Utilizing Social Influence in Content Distribution Networks," IEEE International Conference on Communications (ICC), Jun. 2011, 6 pages, Kyoto, Japan.

S. Ioannidis et al., "Optimal and Scalable Distribution of Content Updates Over a Mobile Social Network," 28th IEEE International Conference on Computer Communications, Joint Conference of the IEEE Computer and Communications Societies (INFOCOM), Apr. 2009, pp. 1422-1430, Rio de Janeiro, Brazil.

J. Whitbeck et al., "Relieving the Wireless Infrastructure: When Opportunistic Networks Meet Guaranteed Delays," 12th IEEE International Symposium on a World of Wireless, Mobile and Multimedia Networks (WOWMOM), Jun. 2011, 10 pages, Lucca, Italy.

FMS Advanced Systems Group, "Social Network Analysis (SNA) Diagrams," http://www.fmsasg.com/SocialNetworkAnalysis/, Feb. 28, 2013, 5 pages.

Leo Join Jane, "How to Stop Spamming Your Followers with Buffer," http://www.probloggingsuccess.com/stop-spamming-followers-buffer-review/, Feb. 28, 2013, 21 pages.

"About Social-Networking," http://stackoverflow.com/tags/social-networking/info, Feb. 28, 2013, 1 page.

"Computer Tools," Lecture 20, http://quizlet.com/8314297/lecture-20-flash-cards/, Nov. 30, 2011, 2 pages.

\* cited by examiner

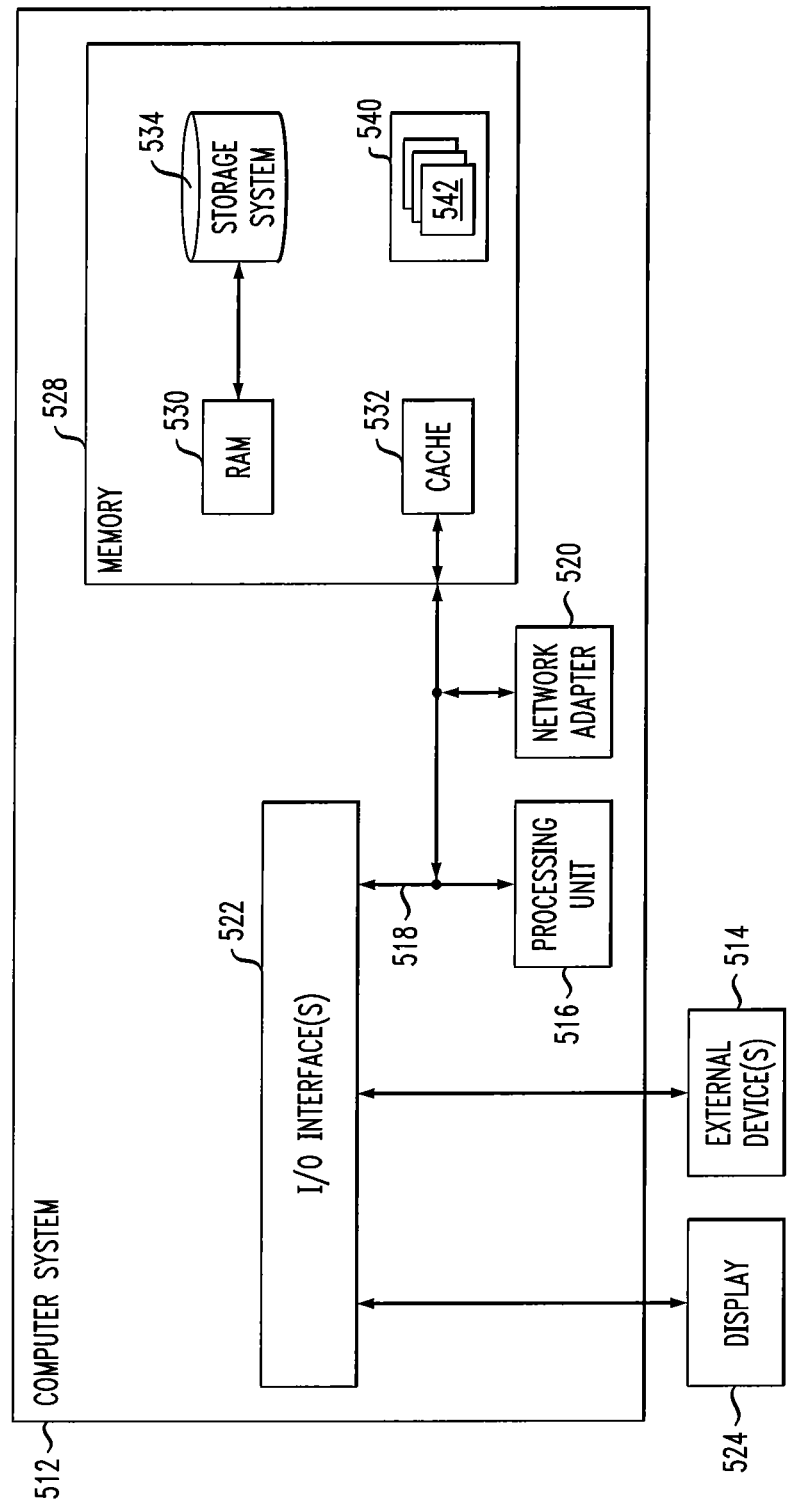

SYSTEMS AND METHODS FOR USING SOCIAL NETWORK ANALYSIS TO SCHEDULE COMMUNICATIONS

CROSS-REFERENCE TO RELATED APPLICATION

This application is a Continuation of U.S. application Ser. No. 13/796,152, filed on Mar. 12, 2013, the disclosure of which is incorporated herein in its entirety by reference.

TECHNICAL FIELD

The field generally relates to systems and methods for improving the effectiveness of communications over a social network, and in particular, to systems and methods for social-network analyses to determine the timing of communications (e.g., messages) so such communications are likely to be most effective and/or viewed by an optimal number of people who, in turn, have various characteristics.

BACKGROUND

A social network is a social structure made up of individuals, groups or organizations, which have been referred to as "nodes," that are tied (connected) by one or more specific types of interdependency. For example, one or more of friendship, business associations, common interest or history, occupation, education, finances, likes/dislikes, or other relationships can connect nodes. In a simple form, a social network is a structure of these connections between nodes. The nodes to which an individual is connected represent the contacts of that individual, and the return or value than an individual derives from the social network can be measured as social capital.

A social network diagram includes nodes as points and lines representing ties or connections between the nodes. Attention given to network theory, i.e., the creation, maintenance, and destruction of such ties, has increased in recent years. The rise in such interest may be attributed to the study of interne connections, and awareness of the roles which social networks play in people's work habits, health, entertainment interests, and many other facets of daily life.

An example of a social networking and microblogging service is TWITTER, enabling its users to send and read messages called "tweets". Tweets are text-based posts displayed on a user's profile page. TWITTER and other social messaging services would be more useful if such systems could optimize the number and nature of message recipients.

SUMMARY

In general, exemplary embodiments of the invention include systems and methods for improving the effectiveness of communications over a social network, and in particular, to systems and methods for social-network analyses to determine the timing of communications.

According to an exemplary embodiment of the present invention, a system for controlling network communication including a memory and a processor communicatively coupled to the processor, an analysis module capable of analyzing a social network in response to a request made by a user to send a message to a node in the social network, and a message control module capable of delaying for a period of time sending of the message based on a result of the analyzing, and sending the message in the social network after the period of time has elapsed.

According to an exemplary embodiment of the present invention, a computer implemented method for controlling network communication, comprises analyzing a social network in response to a request made by a user to send a message to a node in the social network, delaying for a period of time sending of the message based on a result of the analyzing, and sending the message to the node in the social network after the period of time has elapsed.

According to an exemplary embodiment of the present invention, an article of manufacture comprises a non-transitory computer readable storage medium comprising program code tangibly embodied thereon, which when executed by a computer, performs method steps for controlling network communication, the method steps comprising analyzing a social network in response to a request made by a user to send a message a node in the social network, delaying for a period of time sending of the message based on a result of the analyzing, and sending the message to the node in the social network after the period of time has elapsed.

According to an exemplary embodiment of the present invention, an apparatus for controlling network communication, comprises a memory, and a processor coupled to the memory and configured to execute code stored in the memory for analyzing a social network in response to a request made by a user to send a message to a node in the social network, delaying for a period of time sending of the message based on a result of the analyzing, and sending the message to the node in the social network after the period of time has elapsed.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 5 illustrates a computer system in accordance with which one or more components/steps of the techniques of the invention may be implemented, according to an embodiment of the invention.

DETAILED DESCRIPTION OF EXEMPLARY EMBODIMENTS

Figure 1:
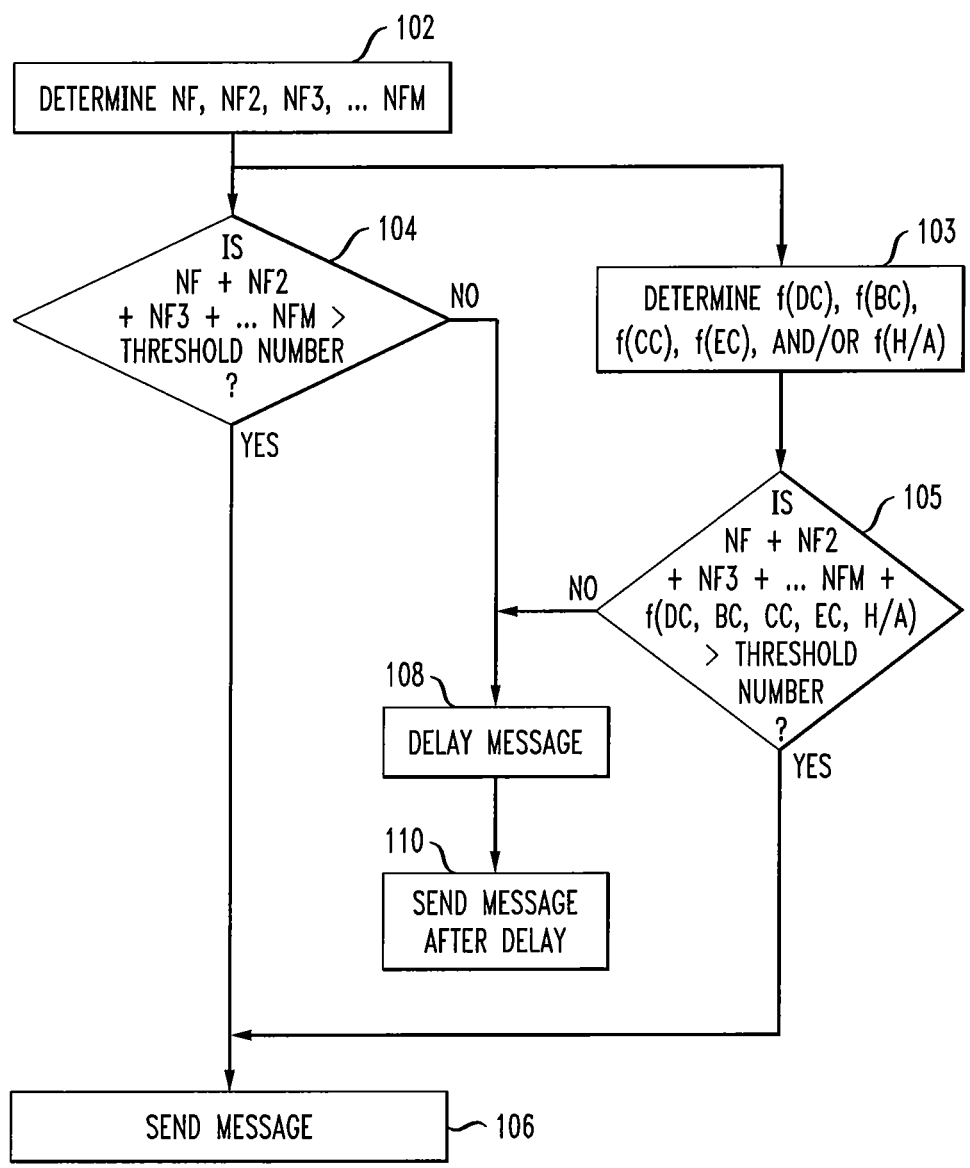
FIG. 1 illustrates a method for improving network communication, according to an embodiment of the present invention.

Exemplary embodiments of the invention will now be discussed in further detail with regard to systems and methods for improving the effectiveness of communications over a social network, and in particular, to systems and methods for social-network analyses to determine the timing of communications. This invention may, however, be embodied in many different forms and should not be construed as limited to the embodiments set forth herein.

Embodiments of the present invention seek to improve the usefulness of social network communications by optimizing the number and nature of message recipients. As an example, a company, book author, government official, or health official may wish to effectively spread a message that markets a product, announces a meeting, provides an insightful observation, or alerts the public of some public-health danger. For such a message to be effective, the message generally needs to reach a large number of people, either directly or indirectly. If the message reaches only a small number of people, it may not be relayed (e.g., "retweeted") to a larger audience. Thus, a viewing potential of the message may lose secondary effects (rebroadcasts) and tertiary effects (rebroadcasts of rebroadcasts).

According to embodiments of the present invention, the following definitions may apply to the following terms used in this disclosure. However, it is to be understood that the embodiments of the invention are not necessarily limited to these definitions.

"Degree Centrality (DC)": a measure of the number of direct relationships, connections and/or links of an entity. According to FMS, Inc., an entity with high degree centrality may have one or more of the following characteristics: (1) an active player in a network; (2) a connector or hub in the network; (3) not necessarily the most connected entity in the network (e.g., another entity may have a larger number of relationships, the majority of which point to low-level entities); (4) in an advantaged position in the network; (5) has alternative avenues to satisfy organizational needs, and consequently may be less dependent on other individuals; and (6) can be identified as a third party or deal maker. See http://www.fmsasg.com/SocialNetworkAnalysis/. However, in accordance with the embodiments of the present invention, it is to be understood that an entity with high degree centrality is not necessarily limited to the preceding characteristics.

"Betweenness Centrality (BC)": identifies an entity's position within a network based the ability of the entity to connect with other pairs or groups in a network. According to FMS, Inc., an entity with a high betweenness centrality may have one or more of the following characteristics: (1) holds a favored or powerful position in a network; (2) represents a single point of failure (e.g., if one takes the single betweenness spanner out of a network, ties will be severed between cliques); and (3) has a greater amount of influence over what happens in a network. See http://www.fmsasg.com/SocialNetworkAnalysis/. However, in accordance with the embodiments of the present invention, it is to be understood that an entity with high betweenness centrality is not necessarily limited to the preceding characteristics.

"Closeness Centrality (CC)": measures the speed at which an entity can access other entities in a network. According to FMS, Inc., an entity with a high closeness centrality may have one or more of the following characteristics: (1) has quick access to other entities in a network; (2) has a short path to other entities; (3) is close to other entities; and (4) has high visibility as to what is happening in the network. See http://www.fmsasg.com/SocialNetworkAnalysis/. However, in accordance with the embodiments of the present invention, it is to be understood that an entity with high closeness centrality is not necessarily limited to the preceding characteristics.

"Eigenvalue Centrality (EC)": measures proximity of an entity to other highly close entities within a network. In other words, referring, for example, to a predetermined sample size portion of a network, or to a global or overall makeup of the network, EC can identify the most central entities of a network. According to FMS, Inc., a high EC may: (1) indicate an actor that is more central to a main pattern of distances among all entities; and/or (2) be a reasonable measure of one aspect of centrality in terms of positional advantage. See http://www.fmsasg.com/SocialNetworkAnalysis/. However, in accordance with the embodiments of the present invention, it is to be understood that a high EC is not necessarily limited to the preceding characteristics.

"Hub/Authority (H/A)": an authority refers to an entity that is pointed to by many other entities. For example, in software packages, relationships can be directional, pointing from one entity to another. If an entity has a high number of relationships pointing to it and/or is more highly connected than other entities, it has a high hub/authority value, and, according to FMS, Inc., may have one or more of the following characteristics: (1) is a knowledge or organizational authority within a domain; and (2) acts as a definitive source of information. See http://www.fmsasg.com/SocialNetworkAnalysis/. However, in accordance with the embodiments of the present invention, it is to be understood that an entity with a high hub/authority value is not necessarily limited to the preceding characteristics.

Embodiments of the present invention may apply to a variety of message transmission services. It is understood that various tools, for example, web-based tools, exist for sending and resending messages, and that embodiments of the present invention are meant to exploit all conceivable tools of this kind. By way of example only, the disclosure refers to TWITTER, but is not limited thereto.

Millions of messages over social networks (e.g., "tweets") can be generated each day, along with millions of search queries. Members of a first social network may repost a message from another member of the first social network, and share the message with members of a second social network to which they belong, referred to, for example, as a "retweet" on TWITTER.

Embodiments of the present invention provide systems and methods that make use of communication network and social network analyses to determine the timing of communications (e.g., messages, tweets, posts, etc.) such that the communications are most likely to be effective at reaching an optimal number of people (e.g., full or approaching full network saturation) meeting certain criteria. The criteria include, but are not limited to, personal or professional characteristics.

As an example, an author may wish to announce the publication of his latest book. The number of users who will see his announcement (e.g., tweet) depends, at least in part, on the users who are active on (e.g., "logged on" to) the social networking system at the time the author sends his message, the characteristics of those users in terms of the probability they will rebroadcast or repost (e.g., "retweet") the message, and the recent activity of the users (e.g., reposting, retweeting activity). According to an embodiment, the terms "active" or "logged on" may include the action of users (e.g., followers) having recently signed into a social network service, or having recently sent a message using the social network service (which may be an implication of a high-level engagement with the social networking service), or the recency of scrolling a graphical user interface (GUI) window of the social-network service (which may be an implication of a high-level engagement with the social networking service). The terms "recently" or "recency" may imply a time period (e.g., within the last 3 minutes), and this time period may be set by the user. According to an embodiment, a schedule for broadcasting, posting, tweeting, etc. the message may coincide with these analyses and determinations, and attempt to reach full network saturation at a given opportune time (e.g., on the morning of the book's release, and/or when online book shopping is expected to be at its highest). Information from the social networks can be obtained through public interfaces or within the social network itself through private access to data that is collected about users of those networks. Depending on design constraints, data can be gathered about every user in the network, or select users based on determinations of their centrality.

If the analysis and scheduling in accordance with the embodiments of the present invention are used, users' rebroadcasting, reposting, retweeting, etc. of the author's message to other users will be performed with increased or maximum effectiveness. For example, rebroadcasting, reposting, retweeting, etc, can reach users who are active on the network at the time of receipt of the message, and who are interested in new books so that the effect of the author's message can be maximized.

Embodiments of the present invention provide one or more of the following, but are not limited to: (1) automatic optimal time selection for broadcast, posting, tweeting, etc. of messages; (2) increased control over how and when a message propagates through a network; and (3) increased message audience (network permeation).

Referring, for example to FIG. 1, a method 100 for improving network communication, according to an embodiment of the present invention, provides for automatic message delay, wherein an effective time of day at which a user may transmit a message to a social network is computed. In accordance with this embodiment, a system determines a number of nodes in a message author's network (e.g., number of "followers" of the author in TWITTER) (NF) who are active and/or logged on to the network at various times. The system can also determine the number of nodes in each network of each node in the author's network (e.g., number of followers of the followers of the author) (NF2) who are active and/or logged on to the network at various times. The system can further determine the number of nodes three times removed from the message author (e.g., followers of the followers of the followers of the author) (NF3) who are active and/or logged on to the network at various times. It is to be understood, that this process can be repeated out to nodes M times removed from the author (NF, NF2, NF3, NF4, . . . NFM) depending on design and feasibility requirements, wherein $M \geq 1$ (Block 102). The nodes may refer to, for example, individuals, groups and/or organizations.

According to an embodiment, referring to block 104, if NF+NF2+NF3+ . . . NFM>threshold number of active recipients, then the message is sent (block 106); otherwise, if <threshold, sending of the message is delayed (block 108). The delay can be until the threshold is met, or until analytics (described further below) predict when the threshold is likely to be met. Referring to block 110, the message is sent after the delay period elapses. The assignment of a value to the threshold may be based on, for example, the size of the social network, goals for message permeation and prior research as to what constitutes effective network saturation. In addition, the threshold may be based on global network statistics, which also determine the effectiveness of any communication given a particular threshold. These statistics may include, for example, network diameter, the average distance between two randomly chosen nodes, measures of the degree distribution (such as the extent to which it approximates a power law), or statistical measures of DC, BC, CC, EC and H/A over all nodes in a network.

According to an embodiment, a calculation of whether the threshold is met may be determined by using absolute numbers or percentages. Alternatively, the system may use analytics to predict if the threshold is likely to be met within a specific period. Analytics may include analyzing historical activity/log-on times to predict the next time users may log in and/or be active. If the analysis reveals that the threshold may not be met in a timely manner, according to an embodiment, the system may automatically lower the threshold to a maximum predicted number of users, and send the message when the maximum predicted number of users is deemed to be active.

According to an embodiment, when calculating whether a threshold is met, additional social-network parameters may be considered, such as, for example, Degree Centrality (DC), Betweenness Centrality (BC), Closeness Centrality (CC), Eigenvalue Centrality (EC), and Hub/Authority (WA), as referenced hereinabove. In this manner, values of f(DC), f(BC), f(CC), f(EC), and/or f(H/A) are determined (block 103), and the equation above becomes: if NF+NF2+NF3+ . . . , NFM+ f(DC, BC, CC, EC, H/A)>threshold number of active recipients (block 105), then the message is sent; otherwise, if <threshold, sending of the message is delayed. The delay can be until the threshold is met, or until analytics predict when the threshold is likely to be met. f(DC), f(BC), f(CC), f(EC), and/or f(H/A) can be, for example, normalized values representing these social network parameters.

Therefore, embodiments of the present invention also recognize that various possible message recipients have differing levels of connectedness. In addition to, or in lieu of optimizing message timing, embodiments of the present invention optimize message transmission to those recipients who are, in turn, hubs. In other words, embodiments of the present invention use social network analysis to determine which recipients are more highly connected than other recipients. In accordance with embodiments of the present invention, the timing of the message delivery can be designed to ensure that these hubs are most likely to receive the message, such that the secondary, tertiary, etc. effects (rebroadcasts) will reach the highest number of possible recipients.

As an example, Closeness Centrality measures how quickly an entity (e.g., user) can access more entities in a network. An entity with high closeness centrality generally has more access to a larger part of the network than an entity with low closeness centrality. Thus, if f(CC)>threshold from 3:00 PM to 4:00 PM for N users in an individual's network, then the system may delay broadcasting, posting, tweeting, etc. a message until this time. It is to be understood that one or more of DC, BC, CC, EC and WA may be omitted from the analysis.

A method for improving network communication, according to an embodiment of the present invention, provides for message timing reporting, wherein a report is given to a user generating the message (e.g., author or public-health official) as to efficacious times in which to send the message.

An electronic social network consists of users of a message generation system and connections between users. As per the method, information associated with each user (e.g., connections, the user is able to program in JAVA, is a vegetarian, etc.) is analyzed. A report is prepared for a user as to effective times during which to send a message based on an analysis of the user's connections (and of connections to the user's connections, etc.) and the information associated with each of the connections of the user, and/or a number of the connections who are active at a predetermined time. The report is sent to the user generating the message as to efficacious times in which to send the message.

Figure 2:
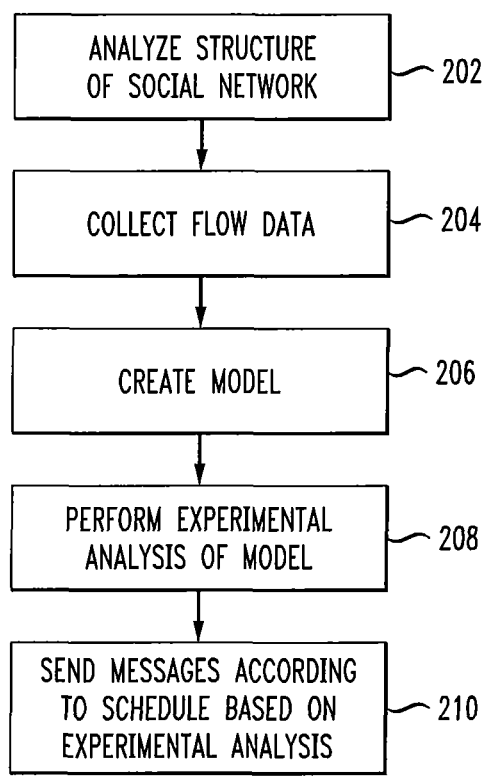
FIG. 2 illustrates a method for improving network communication, according to an embodiment of the present invention.

Referring to FIG. 2, a method 200 for improving network communication, according to an embodiment of the present invention takes into account message flow dynamics. The method comprises analyzing a social network's structure (e.g., number and configuration of nodes and connections between nodes) (block 202), and collecting data on information flow through the observed structure based on, for example, broadcasts, posts, tweets, email, instant messages, etc. (block 204). Flow data can be gathered by taking active measurements of message propagation through nodes of the network. A model of the network and information flow dynamics through its nodes is created using, for example, coupled models of message integration and transmission (simple nonlinear integrators) (block 206). For example, a set of models may be instantiated with separate integration time constants. Connections between models may be established during initialization of the simulation, according to certain parameters that govern the resulting connection patterns and network statistics. These models maintain their own state in a computational simulation, and each computes separately within a simulation time step. After all models are computed, models then communicate their current state to each other, which in turn is used to compute the next integration time step.

Experimental analysis of the model network for measurements of message propagation, including transmission times and messages that optimally propagate through the network is performed (block 208). In accordance with an embodiment of the present invention, to accomplish this, message propagation is recorded as transmission events. A transmission event is recorded as a combination of the following: 1) the time step upon which the message is transmitted, 2) the sending node's identity, 3) the receiving node's identity, and 4) the identity of the message. These data may also be represented as a directed transmission network, wherein connections between network elements represent transmission events of a particular message on a given time step or over a range of time steps. Determining network propagation from such a transmission network involves comparing the number of nodes in the network to the number of nodes in the original social network that the message targeted as a ratio. As this ratio approaches 1, the propagation of the message can be assumed to be perfect. Messages are sent to nodes in the real network according to a schedule based on the experimental analysis of the model network (block 210).

Flow dynamics can be affected by a number of factors which the embodiments of the present invention can account for, including but not limited to, time zones, work patterns, relationships between individuals, and demographics of the entities receiving the message (e.g., younger users may propagate messages faster than older users).

Figure 3:
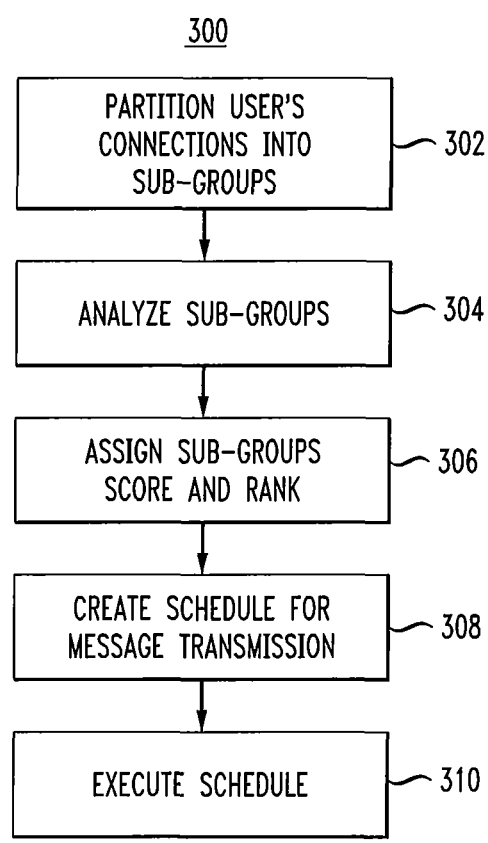
FIG. 3 illustrates a method for improving network communication, according to an embodiment of the present invention.

Referring to FIG. 3, a method 300 for improving network communication, according to an embodiment of the present invention, performs optimal partitioning, wherein a user's connections are partitioned to create sub groups of connections, referred to as "targets" (block 302). The targets are analyzed in accordance with the disclosed methods to determine when sending, posting, broadcasting, tweeting, etc. a message would be most effective at reaching a larger community through the targets (block 304). Such analysis can include, for example, looking at the activity and connections of the members of a target.

Different targets are created and analyzed to find the optimal partitioning. As a result, a series of message broadcasts, posts, tweets, etc. (the series including the same message, and/or different messages) can be sent to different targets at different times in order to create an optimal synergistic effect.

In accordance with embodiments of the present invention, connections can be analyzed according to subgroups, wherein each subgroup is selected randomly or according to an optimization strategy, and then analyzed for message transmission effectiveness according to connection characteristics, and characteristics of the connections' connections, and so on.

The method further includes assigning the subgroups a score and ranking the subgroups according to one or more of content of a message, timing of a message, and expected effectiveness of message retransmission and/or expected message retransmission via the subgroup (block 306). Subgroups that are optimal for a particular transmission are then targeted and analyzed as a group. Groups and ranks of targets can be transformed into a schedule that includes different targets and times to send messages (block 308). Then, an optimal transmission schedule is executed over the targets at different times (block 310). In accordance with embodiments of the present invention, targets may comprise non-overlapping or overlapping sets of connections.

Implementation of the embodiments of the present invention allows for the creation of synergies that would otherwise be unavailable. For example, in accordance with embodiments, a central node can be attacked first, then with some delay, next most central contacts can be attacked, and waves of messages that converge simultaneously on the central node can be created, thus increasing the likelihood that a message will be resent, and thus reach the maximum downstream group.

A method for improving network communication, according to an embodiment of the present invention takes into account the structure of the network and the reliability of the transmission at each node in the network. For example, a message may quickly saturate a network with a very large diameter (i.e., a network in which most nodes connect to most other nodes) even when the probability (reliability) of transmission by any node is low. Conversely, a sparsely connected network would require highly reliable transmission of messages in order to saturate a network.

Embodiments of the present invention, therefore, target messages to particular nodes in a communication network, and time communication of these messages based on structure and reliability to allow for synergistic effects during re-transmission, therefore maximizing the likelihood of network saturation. The methods for analysis in connection with structure and reliability can be combined with previously discussed techniques of network analysis, simulation, and optimization.

Figure 4:
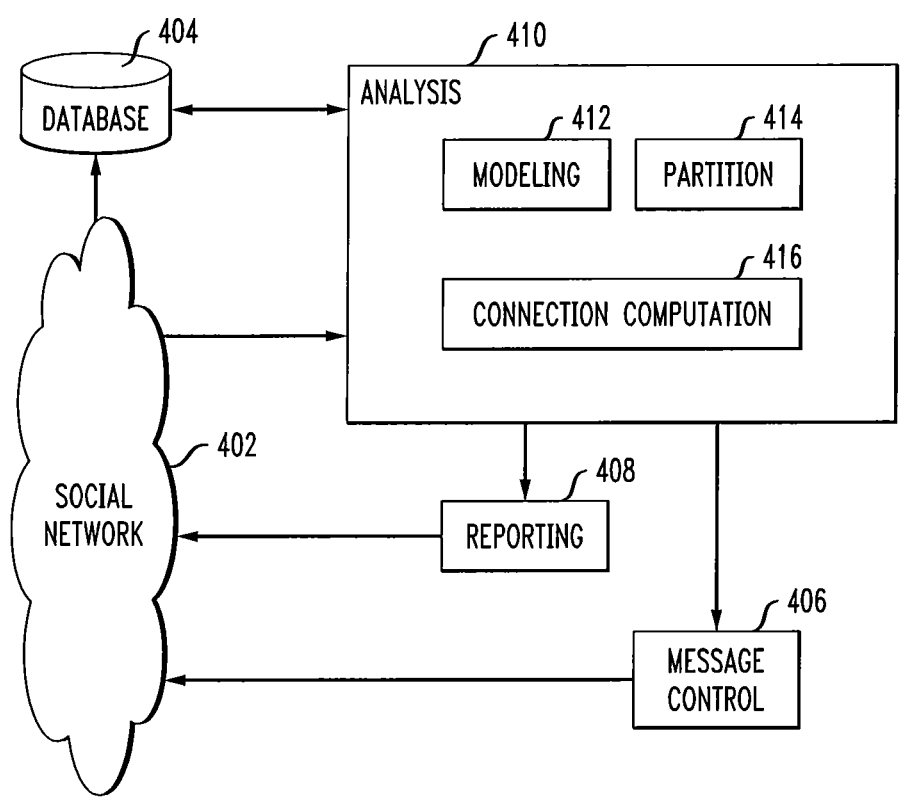
FIG. 4 illustrates a system for improving network communication, according to an embodiment of the present invention.

Referring to FIG. 4, a system 400 for improving network communication, according to an embodiment of the present invention, comprises an electronic social network 402 including users of a message generation system (e.g., TWITTER, FACEBOOK, GOOGLE+, etc.) and connections between users. The system includes a database 404, where information associated with each user (e.g., connections, the user is able to program in JAVA, is a vegetarian, etc.) is stored.

The system includes an analysis module 410 which can analyze a social network in response to requests made by users to send messages in the social network, and a message control module 406 which can delay sending of the messages for a period of time based on a result of the analyses by the analysis module 410. The message control module 406 sends the messages in the social network 402 after the period of time has elapsed. According to an embodiment, the analysis module 410 collects data on information flow through a structure of the social network to use in the analyses. The collection of data on information flow can be based on, for example, broadcasts, posts, tweets, email, instant messages, etc. Flow data can be gathered by taking active measurements of message propagation through nodes of the network 402.

In accordance with an embodiment of the present invention, the analysis module 410 includes a modeling module 412 which creates models of the social network and information flow dynamics through nodes of the network 402. The model can be created using, for example, coupled models of message integration and transmission (simple nonlinear integrators). The modeling module 412 experimentally analyzes the models for measurements of message propagation through the model networks, and the message control module 406 sends the messages to nodes in the social network 402 according to schedules based on the experimental analyses of the model networks.

According to an embodiment of the present invention, the analysis module 410 also includes a partition module 414 which can partition connections of a user within the network 402 to create sub groups of connections, referred to as "targets", and the message control module 406 can send messages to different sub groups at different times in order to create an optimal synergistic effect. The targets can be analyzed by the analysis module 410 to determine when sending, posting, broadcasting, tweeting, etc. a message would be most effective at reaching a larger community through the targets.

In accordance with embodiments of the present invention, the partition module 414 can select each subgroup randomly or according to an optimization strategy, and then the analysis module 410 can analyze each subgroup for message transmission effectiveness according to connection characteristics, and characteristics of the connections' connections, and so on. The analysis module 410 can assign the subgroups a score and rank the subgroups according to one or more of content of a message, timing of a message, and expected effectiveness of message retransmission and/or expected message retransmission via the subgroup. The message control module 406 can transform groups and ranks of targets into a schedule that includes different targets and times to send messages. Then, the message control module 406 can execute an optimal transmission schedule over the targets at different times.

The analysis module 410 can also include a connection computation module 416 which determines a number of nodes connected to any given user who are active on the network and determines if the number is above a threshold value. The message control module 406 delays sending of messages if the number is less than the threshold value. In accordance with an embodiment, the connection computation module 416 can determine a number of nodes in a message author's network (e.g., number of "followers" of the author in TWITTER) (NF) who are active and/or logged on to the network at various times, the number of nodes in each network of each node in the author's network (e.g., number of followers of the followers of the author) (NF2) who are active and/or logged on to the network at various times, and the number of nodes three times removed from the message author (e.g., followers of the followers of the followers of the author) (NF3) who are active and/or logged on to the network at various times. It is to be understood, that this process can be repeated out to nodes M times removed from the author (NF, NF2, NF3, NF4, . . . NFM) depending on design and feasibility requirements. As stated above, nodes may refer to, for example, individuals, groups and/or organizations.

According to an embodiment, the connection computation module 416 applies the following equation to determine if a message should be sent: if $NF+NF2+NF3+\ldots NFM$>threshold number of active recipients, then the message is sent by the message control module 406; otherwise, if <threshold, sending of the message is delayed by the message control module 406. The delay can be until the threshold is met, or until analytics predict when the threshold is likely to be met.

The connection computation module 416 can perform the calculation of whether the threshold is met by using absolute numbers or percentages, or by using analytics to predict if the threshold is likely to be met within a specific period.

According to an embodiment, when calculating whether a threshold is met, the connection computation module 416 can factor in additional social-network parameters, such as, for example, Degree Centrality (DC), Betweenness Centrality (BC), Closeness Centrality (CC), Eigenvalue Centrality (EC), and Hub/Authority (H/A), as referenced hereinabove. In this manner, the equation above may become: if $NF+NF2+NF3+\ldots NFM+f(DC, BC, CC, EC, H/A)$>threshold number of active recipients, then the message is sent; otherwise, if <threshold, sending of the message is delayed.

In accordance with an embodiment of the present invention, the system 400 further includes a reporting module 408 which can provide a report to users as to at least one efficacious time in which to send the messages. The reporting module can determine if a report should be sent to a user, and generate the report based on, for example, an analysis of the user's connections (and of connections to the user's connections, etc.) and the information associated with each of the user's connections, and/or a number of connections who are active at a predetermined time.

In addition, according to an embodiment, the analysis module 410 is also able to determine a reliability of transmission of a message at a plurality of nodes in the network 402.

The system can be implemented on a centralized server accessible via a network, a cloud service or on a specific machine. The network through which the centralized server is accessed can include, but is not limited to, for example, a local area network (LAN), wide area network (WAN), cellular network, satellite network and the Internet.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario; the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1-4 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for controlling network communication, comprising:
    a processor and a memory communicatively coupled to the processor;
    an analysis module capable of analyzing a social network in response to a request made by a user to send a message to a node in the social network; and
    a message control module capable of delaying for a period of time sending of the message based on a result of the analyzing, and sending the message in the social network after the period of time has elapsed;
    wherein the analysis module comprises a connection computation module capable of:
        determining a number of nodes connected to the user which are active on the social network, wherein the active nodes each correspond to at least one of an individual, group and organization;
        determining if the number of the active nodes on the social network is above a threshold value, wherein the message control module is capable of delaying the sending of the message if the number of the active nodes on the social network is less than the threshold value; and
        determining whether a combination of the number of the active nodes with at least one centrality value is less than the threshold value;
    wherein the at least one centrality value comprises a normalized value representing at least one of Degree Centrality (DC), Betweenness Centrality (BC), Closeness Centrality (CC), Eigenvalue Centrality (EC), and Hub/Authority (H/A).

2. The system of claim 1, wherein the analysis module is capable of collecting data on information flow through a structure of the social network.

3. The system of claim 1, wherein the analysis module comprises a modeling module capable of creating a model of the social network and information flow dynamics through nodes of the network.

4. The system of claim 3, wherein the modeling module is capable of experimentally analyzing the model for measurements of message propagation through the model network.

5. The system of claim 4, wherein the message control module is capable of sending the message to at least two nodes in the social network according to a schedule based on the experimental analysis of the model network.

6. The system of claim 1, wherein the analysis module comprises a partition module capable of partitioning connections of the user within the social network to create at least two sub groups of connections.

7. The system of claim 6, wherein the message control module is capable of sending the message to different sub groups at different times.

8. The system of claim 1, further comprising a reporting module capable of providing a report to the user as to at least one efficacious time in which to send the message.

9. The system of claim 1, wherein the analysis module is further capable of determining a reliability of transmission of the message at a plurality of nodes in the social network.

10. The system of claim 1, wherein a given node is active if at least one of an individual, group and organization corresponding to the given node is logged on to the social network.

11. The system of claim 1, wherein the message control module is capable of delaying the sending of the message until the number of the active nodes on the social network is greater than the threshold value.

12. The system of claim 1, wherein the connection computation module is further capable of predicting when the threshold value is likely to be met, wherein the message control module is capable of delaying the sending of the message until a predicted time when the threshold value is likely to be met.

13. An article of manufacture comprising a non-transitory computer readable storage medium comprising program code tangibly embodied thereon, which when executed by a computer, performs method steps for controlling network communication, the method steps comprising:
    analyzing a social network in response to a request made by a user to send a message a node in the social network;
    delaying for a period of time sending of the message based on a result of the analyzing; and
    sending the message to the node in the social network after the period of time has elapsed;
    wherein analyzing comprises:
        determining a number of nodes connected to the user which are active on the social network, wherein the active nodes each correspond to at least one of an individual, group and organization;
determining if the number of the active nodes on the social network is above a threshold value;
delaying the sending of the message if the number of the active nodes on the social network is less than the threshold value; and
determining whether a combination of the number of the active nodes with at least one centrality value is less than the threshold value;
wherein the at least one centrality value comprises a normalized value representing at least one of Degree Centrality (DC), Betweenness Centrality (BC), Closeness Centrality (CC), Eigenvalue Centrality (EC), and Hub/Authority (H/A).

14. An apparatus for controlling network communication, comprising:
a memory; and
a processor coupled to the memory and configured to execute code stored in the memory for:
analyzing a social network in response to a request made by a user to send a message to a node in the social network;
delaying for a period of time sending of the message based on a result of the analyzing; and
sending the message to the node in the social network after the period of time has elapsed; wherein analyzing comprises:
determining a number of nodes connected to the user which are active on the social network, wherein the active nodes each correspond to at least one of an individual, group and organization;
determining if the number of the active nodes on the social network is above a threshold value;
delaying the sending of the message if the number of the active nodes on the social network is less than the threshold value; and
determining whether a combination of the number of the active nodes with at least one centrality value is less than the threshold value;
wherein the at least one centrality value comprises a normalized value representing at least one of Degree Centrality (DC), Betweenness Centrality (BC), Closeness Centrality (CC), Eigenvalue Centrality (EC), and Hub/Authority (H/A).

* * * * *